(12) United States Patent
Freeman et al.

(10) Patent No.: US 8,576,468 B2
(45) Date of Patent: Nov. 5, 2013

(54) SCANNING PROJECTOR WITH DYNAMIC SCAN ANGLE

(75) Inventors: Mark O. Freeman, Snohomish, WA (US); Joshua O. Miller, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 422 days.

(21) Appl. No.: 12/887,886

(22) Filed: Sep. 22, 2010

(65) Prior Publication Data
US 2012/0069415 A1 Mar. 22, 2012

(51) Int. Cl.
*G02B 26/08* (2006.01)

(52) U.S. Cl.
USPC ........... 359/202.1; 359/224.1; 359/904

(58) Field of Classification Search
USPC ......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | | | |
|---|---|---|---|---|
| 2005/0253055 | A1* | 11/2005 | Sprague et al. | 250/234 |
| 2008/0144150 | A1* | 6/2008 | Champion et al. | 359/199 |
| 2008/0297868 | A1* | 12/2008 | Mizumoto | 359/199 |

* cited by examiner

*Primary Examiner* — Jennifer L. Doak
(74) *Attorney, Agent, or Firm* — Kevin D. Wills

(57) ABSTRACT

A scanning projector includes a MEMS device with a scanning mirror that sweeps a beam in two dimensions. Actuating circuits receive scan angle information and provide signal stimulus to the MEMS device to control the amount of mirror deflection on two axes. The period of movement on one or both axes may be modified to effect changes in line density in a resultant display.

14 Claims, 11 Drawing Sheets

SCANNING PROJECTOR WITH DYNAMIC SCAN ANGLE

FIELD

The present invention relates generally to projection systems, and more specifically to scanning projection systems.

BACKGROUND

Scanning projectors typically scan a light beam in a raster pattern to project an image made up of pixels that lie on the scan trajectory of the raster pattern. The size of the display produced by scanning projectors is typically a function of the distance between the projector and the display surface, as well as the vertical and horizontal scan angles of the raster pattern.

DESCRIPTION OF EMBODIMENTS

Figure 1:
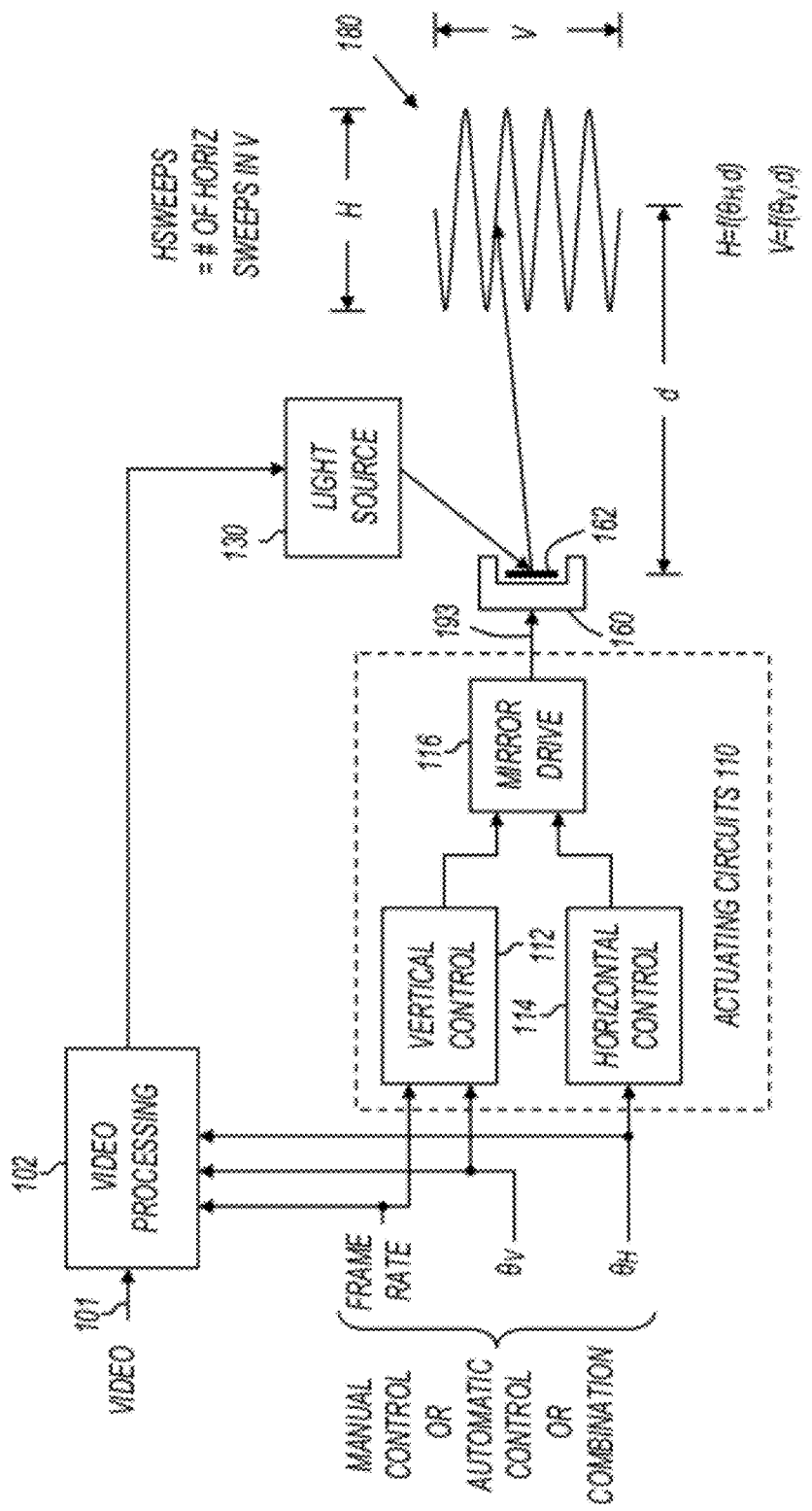
FIG. 1 shows a dynamic scan angle projection apparatus in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled.

In the drawings, like numerals refer to the same or similar functionality throughout the several views.

FIG. 1 shows a dynamic scan angle projection apparatus in accordance with various embodiments of the present invention. Apparatus 100 includes video processing component 102, light source 130, micro-electronic machine (MEMS) device 160 having scanning mirror 162, and actuating circuits 110. Actuating circuits 110 include vertical control component 112, horizontal control component 114, and mirror drive component 116.

In operation, video processing component 102 receives video data on node 101 and produces display pixel data to drive light source 130 when pixels are to be displayed. The video data 101 represents image source data that is typically received with pixel data on a rectilinear grid, but this is not essential. For example, video data 101 may represent a grid of pixels at any resolution (e.g., 640×480, 848×480, 1920×1080). Dynamic scan angle projection apparatus 100 is a scanning projector that scans a raster pattern. The raster pattern does not necessarily align with the rectilinear grid in the image source data, and video processing component 102 operates to produce display pixel data that will be displayed at appropriate points on the raster pattern. For example, in some embodiments, video processing component 102 interpolates vertically and/or horizontally between pixels in the source image data to determine display pixel values along the scan trajectory of the raster pattern.

Light source 130 receives display pixel data and produces light having grayscale values in response thereto. Light source 130 may be monochrome or may include multiple different color light sources. For example, in some embodiments, light source 130 includes red, green, and blue light sources. In these embodiments, video processing component 102 outputs display pixel data corresponding to each of the red, green, and blue light sources. Also for example, light produced by light source 130 may be visible or nonvisible. For example, in some embodiments, one or more sources of light within light source 130 may produce infrared (IR) light.

In some embodiments, light source 130 may include one or more laser light producing devices. For example, in some embodiments, the light source 130 may include laser diodes. In these embodiments, light source 130 also includes driver circuits that accept the display pixel values and produce current signals to drive the laser diodes. The light from light source 130 is directed to mirror 162. In some embodiments, optical elements are included in the light path between light source 130 and mirror 162. For example, dynamic scan angle projection apparatus 100 may include collimating lenses, dichroic mirrors, or any other suitable optical elements.

Scanning mirror 162 deflects on two axes in response to electrical stimuli received on node 193 from actuating circuits 110. While moving on the two axes, scanning mirror 162 reflects light provided by light source 130. The reflected light sweeps a raster pattern and creates a resultant display at 180. The shape of the raster pattern swept by scanning mirror 162 is a function of the mirror movement on its two axes. For example, in some embodiments, scanning mirror 162 sweeps in a first dimension (e.g., vertical dimension) in response to sawtooth wave stimulus, resulting in a substantially linear and unidirectional vertical sweep. Also for example, in some embodiments, scanning mirror 162 sweeps in a second dimension (e.g., horizontal dimension) according to a sinusoidal stimulus, resulting in a substantially sinusoidal horizontal sweep.

MEMS device 160 is an example of a scanning mirror assembly that scans light in two dimensions. In some embodiments the scanning mirror assembly includes a single mirror that scans in two dimensions (e.g., on two axes). Alternatively, in some embodiments, MEMS device 160 may be an assembly that includes two scan mirrors, one which deflects the beam along one axis, and another which deflects the beam along a second axis largely perpendicular to the first axis.

The resultant display has a height (V) and a width (H) that are a function of the distance (d) from scanning mirror 162 to the projection surface, as well as the scan angles of the mirror. As used herein, the term "scan angle" refers to the total angle through which the mirror deflects rather than an instantaneous angular displacement of the mirror. The width (H) is a function of the distance (d) and the horizontal scan angle ($\theta_H$). This relationship is shown in FIG. 1 as $$H=f(\theta_H,d). \qquad (1)$$

The height (V) is a function of the distance (d) and the vertical scan angle ($\theta_V$). This relationship is shown in FIG. 1 as $$V=f(\theta_V,d). \qquad (2)$$

In various embodiments of the present invention, either or both of the vertical and horizontal scan angles are dynamically modified during operation of the scanning projection apparatus to accomplish various results. Example results include changing the size or aspect ratio of the resultant display, maintaining the size of the resultant display as the distance (d) changes, and maintaining image brightness as the distance and/or aspect ratio changes.

As shown in FIG. 1, horizontal control component 114 receives signal stimulus that represents the horizontal scan angle, and vertical control component 112 receives signal stimulus that represents the vertical scan angle. The scan angle signal stimulus may be provided on multiple signal lines (e.g., dedicated signal lines, or a shared bus) or may be provided on a single signal line (e.g., a serial bus). The manner in which signal stimulus is provided is not a limitation of the present invention.

Horizontal control component 114 and vertical control component 112 receive the scan angle signal stimulus and produce signals to effect actual mirror movement through the specified scan angles. The signals produced by vertical control component 112 and horizontal control component 114 are combined by mirror drive component 116, which drives MEMS device 160 with a composite signal on node 193. In some embodiments that include two scan mirrors, MEMS device 160 is driven directly by signals produced by vertical control component 112 and horizontal control component 114.

The horizontal and vertical scan angles may be controlled manually, automatically, or any combination. For example, user controls may be provided to allow a user to modify scan angles. Also for example, a video source application may specify scan angles or an aspect ratio for the projection apparatus to use.

The number of horizontal sweeps per vertical sweep in the raster pattern is referred to herein as HSWEEPS. In some embodiments, HSWEEPS changes as one or both scan angles change, and in other embodiments, HSWEEPs remains constant as one or more scan angles change. For example, if the vertical scan angle is reduced, the spatial density of horizontal sweeps will increase if d and HSWEEPS remain constant. In some embodiments, it may be desirable to modify HSWEEPS to allow for various (or constant) spatial density of horizontal sweeps. This is shown in greater detail in FIGS. 4 and 5.

In some embodiments, the number of horizontal sweeps (HSWEEPS) is related to the frame rate. For example, if the horizontal sweep frequency is fixed (as it is in mechanically resonant systems) then the frame rate and HSWEEPS are inversely related. As shown in FIG. 1, in some embodiments, the frame rate may be modified along with the scan angles. This allows control of the size and aspect ratio of the resultant display, as well HSWEEPS, which affects the spatial density of horizontal sweeps in the resultant display. As used herein, the term "frame rate" refers to the rate at which the raster pattern repeats, and is not necessarily related to a frame rate of any incoming video.

In some embodiments, the frame rate and scan angles are provided to video processing component 102. Video processing component 102 may utilize this information to modify the image to be displayed. For example, video processing component 102 may modify the display contents or the interpolation algorithms based on this information.

Although FIG. 1 shows actuating circuits 110 receiving the frame rate and vertical and horizontal scan angles, this is not a limitation of the present invention. For example, in some embodiments, actuating circuits 110 receive signal stimulus that represents HSWEEPS. Further, in some embodiments, actuating circuits 110 receive signal stimulus that represents an aspect ratio rather than scan angles.

Figure 2:
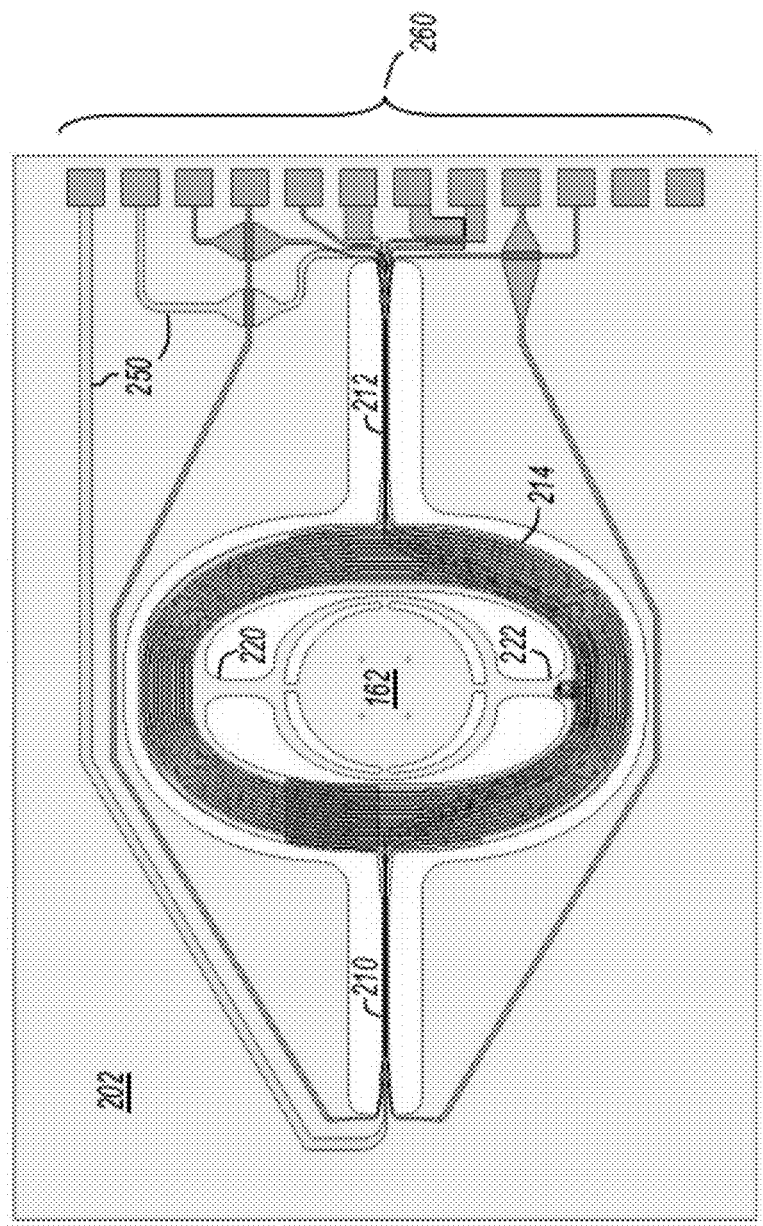
FIG. 2 shows a plan view of a microelectromechanical system (MEMS) device with a scanning mirror.

FIG. 2 shows a plan view of a microelectromechanical system (MEMS) device with a scanning mirror. MEMS device 160 includes fixed platform 202, scanning platform 214 and scanning mirror 162. Scanning platform 214 is coupled to fixed platform 202 by flexures 210 and 212, and scanning mirror 162 is coupled to scanning platform 214 by flexures 220 and 222. Scanning platform 214 has a drive coil connected to drive lines 250, which are driven by a composite signal provided on node 193 from actuating circuits 110 (FIG. 1). Current driven into drive lines 250 produces a current in the drive coil. Two of the interconnects 260 are coupled to drive lines 250.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 214, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 210 and 212 form a pivot axis. Flexures 210 and 212 are flexible members that undergo a torsional flexure, thereby allowing scanning platform 214 to rotate on the pivot axis and have an angular displacement relative to fixed platform 202. Flexures 210 and 212 are not limited to torsional embodiments as shown in FIG. 2. For example, in some embodiments, flexures 210 and 212 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Mirror 162 pivots on a first axis formed by flexures 220 and 222, and pivots on a second axis formed by flexures 210 and 212. The first axis is referred to herein the horizontal axis, and the second axis is referred to herein as the vertical axis. The distinction between vertical and horizontal is somewhat arbitrary, since a rotation of the projection apparatus will cause a rotation of the two axes. Accordingly, the various embodiments of the present invention are not to be limited by the terms "horizontal" and "vertical."

In some embodiments, scanning mirror 162 scans at a mechanically resonant frequency on the horizontal axis resulting in a sinusoidal horizontal sweep. Further, in some embodiments, scanning mirror 162 scans vertically at a non-resonant frequency, so the vertical scan frequency can be controlled independently.

In various embodiments of the present invention, one or more scan angles of mirror 162 are modified during operation. For example, the horizontal scan angle may be modified, the vertical scan angle may be modified, or both may be modified. Further, in some embodiments, the period of the vertical sweep may be modified to control the frame rate and/or HSWEEPS. The scan angles and periods may be controlled and modified by signal stimulus received on drive lines 250. This signal stimulus is provided on node 193 by actuating circuits 110 (FIG. 1).

The particular MEMS device embodiment shown in FIG. 2 is provided as an example, and the various embodiments of the invention are not limited to this specific implementation. For example, any scanning mirror capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 160 uses a drive coil on a moving platform with a static magnetic field, other embodiments may include a magnet on a moving platform with drive coil on a fixed platform. Further, the mirror drive mechanism may include an electrostatic drive mechanism.

Figure 3:
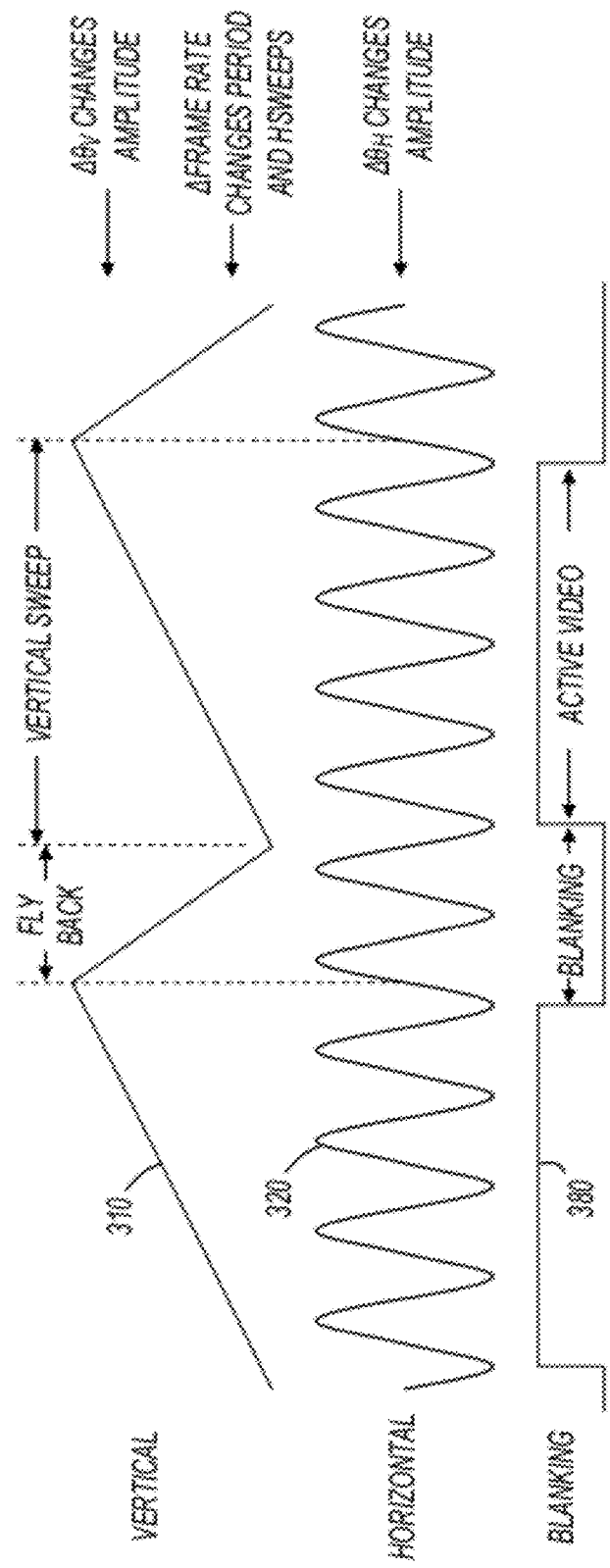
FIG. 3 shows deflection waveforms resulting from a linear vertical trajectory and a sinusoidal horizontal trajectory.

FIG. 3 shows example waveforms suitable for the operation of the dynamic scan angle projection apparatus of FIG. 1. Vertical deflection waveform 310 is a sawtooth waveform, and horizontal deflection waveform 320 is a sinusoidal waveform. When mirror 162 is deflected on its vertical and horizontal axes according to the waveforms 310 and 320, the scanned beam trajectory shown in the left side of FIGS. 4 and 5 results.

Deflection of mirror 162 according to waveforms 310 and 320 may be achieved by driving MEMS device 160 with the appropriate drive signals. In some embodiments, the horizontal deflection frequency is at a resonant frequency of the mirror and a very small excitation at that frequency will result in the desired scan angle. A sawtooth drive signal for the vertical deflection may be derived from a sum of sine waves at various frequencies. The drive signal for the vertical deflection may also be derived from specific points programmed into a waveform generator.

Although a sawtooth drive signal will result in the vertical deflection shown in FIG. 3, other drive signal embodiments exist. For example, in some embodiments, the vertical drive signal may be triangle wave (where subsequent frames are written top to bottom followed by bottom to top alternating each frame) or sinusoidal waveforms.

Sawtooth vertical deflection waveform 310 includes vertical sweep portions and flyback portions. In some embodiments, pixels are displayed during the vertical sweep portions, and not during the flyback portions. The flyback portions correspond to the beam "flying back" to the top of the image field of view. Blanking waveform 380 is also shown in FIG. 3. The scanned beam is blanked (no pixels are displayed) during flyback, and is not blanked during the vertical sweep.

For clarity of explanation, FIG. 3 shows only a few horizontal cycles per vertical sweep. In practice, many more horizontal cycles are present. For example, a horizontal resonant frequency of 24.5 kHz and a frame rate of 60 Hz will yield about 408 horizontal cycles per vertical sweep.

The amplitude of horizontal deflection waveform 320 corresponds to the horizontal scan angle. As the amplitude increases, the scan angle also increases. Referring now back to FIG. 1, as $\theta_H$ increases, actuating circuits 110 provide stimulus to MEMS 160 that causes the amplitude of horizontal deflection waveform 320 to increase. Stated generally, a change in $\theta_H$ ($\Delta\theta_H$) results in a change in the amplitude of the horizontal deflection waveform 320. Similarly, the amplitude of vertical deflection waveform 310 corresponds to the vertical scan angle. As the amplitude increases, the scan angle also increases. Referring now back to FIG. 1, as $\theta_V$ increases, actuating circuits 110 provide stimulus to MEMS 160 that causes the amplitude of vertical deflection waveform 310 to increase. Stated generally, a change in $\theta_V$ ($\Delta\theta_V$) results in a change in the amplitude of the vertical deflection waveform 310.

The period of vertical deflection waveform 310 is related to the frame rate. As the frame rate increases, the period of vertical deflection waveform 310 decreases. In systems with a fixed horizontal scanning frequency, the number of horizontal sweeps per vertical sweep (HSWEEPS) also changes with the frame rate. Stated generally, a change in frame rate ($\Delta$frame rate) results in a change in the period of vertical deflection waveform 310, and may result in a change in HSWEEPS.

Figure 4:
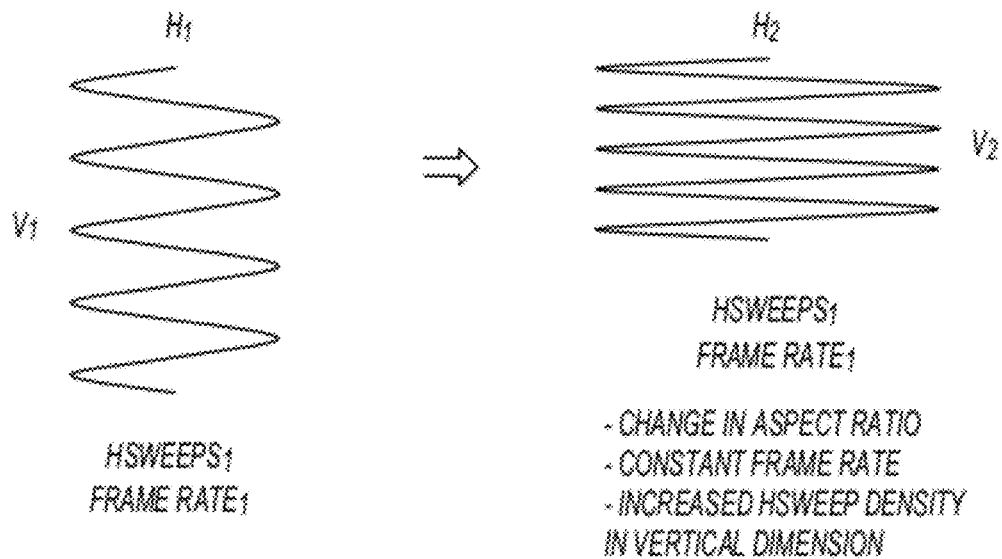
FIG. 4 shows an example dynamic scan angle modification with a constant frame rate.

FIG. 4 shows an example dynamic scan angle modification with a constant frame rate. The left side of FIG. 4 shows a resultant display with a width $H_1$, a height $V_1$, a frame rate FRAME RATE$_1$, and a number of horizontal sweeps per vertical sweep HSWEEPS$_1$. The right side of FIG. 4 shows the resultant display when the width is increased to $H_2$ and the height is decreased to $V_2$ while maintaining the same number of horizontal sweeps per vertical sweep and maintaining the same frame rate. Referring now back to FIG. 3, this corresponds to a decrease in the amplitude of vertical deflection waveform 310, an increase in the amplitude of horizontal deflection waveform 320, and no change in the period of vertical deflection waveform 310. Note that the spatial density of horizontal sweeps in the vertical dimension is increased because the vertical scan angle has been decreased while maintaining a constant frame rate.

The dynamic scan angle modification shown in FIG. 4 results from an increase in $\theta_V$ and a decrease in $\theta_H$ maintaining the same frame rate. Referring now back to FIG. 1, signal stimulus representing $\theta_H$ and $\theta_V$ may be provided to actuating circuits 110 during operation of the projection apparatus to effect the dynamic scan angle modification. The signal stimulus representing $\theta_H$ and $\theta_V$ may be provided in any manner and may be the result of automatic or manual control of scan angles.

Figure 5:
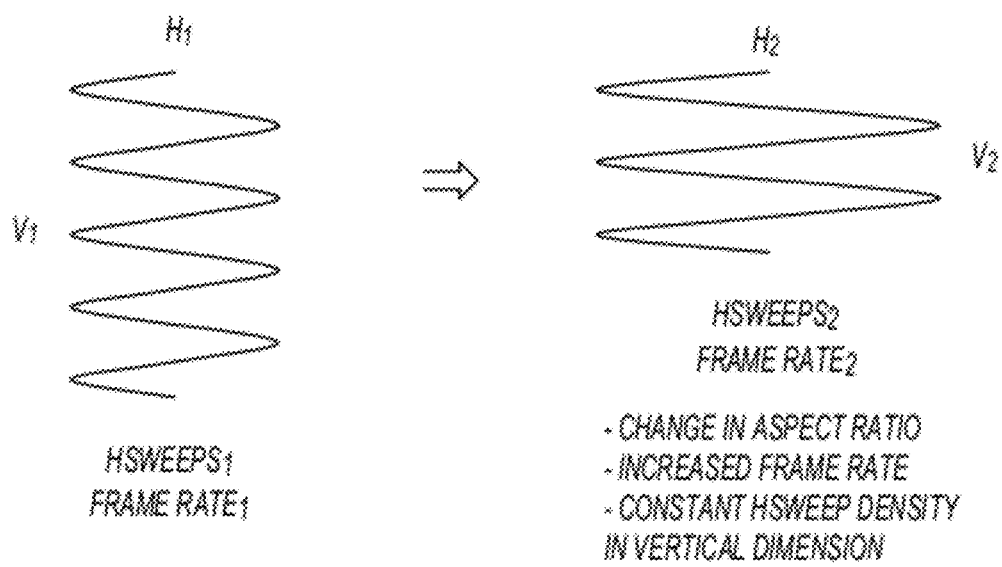
FIG. 5 shows an example dynamic scan angle modification with an increased frame rate.

FIG. 5 shows an example dynamic scan angle modification with an increased frame rate. The example dynamic scan angle modification shown in FIG. 5 modifies the two scan angles $\theta_H$ and $\theta_V$ in the same manner as shown in FIG. 4 resulting in the width of the resultant display changing from $H_1$ to $H_2$, and resulting in the height of the resultant display changing from $V_1$ to $V_2$.

The example dynamic scan angle modification of FIG. 5 differs from that of FIG. 4 in that the frame rate is increased from FRAME RATE$_1$ to FRAME RATE$_2$. As a result, the number of horizontal sweeps per vertical sweep in the resultant display decreases from HSWEEPS$_1$ to HSWEEPS$_2$. In the example of FIG. 5, $\theta_V$ and the frame rate have been modified to maintain a constant HSWEEP density. In some embodiments, both the $\theta_V$ and the frame rate are modified without maintaining a constant HSWEEP density.

Figure 6:
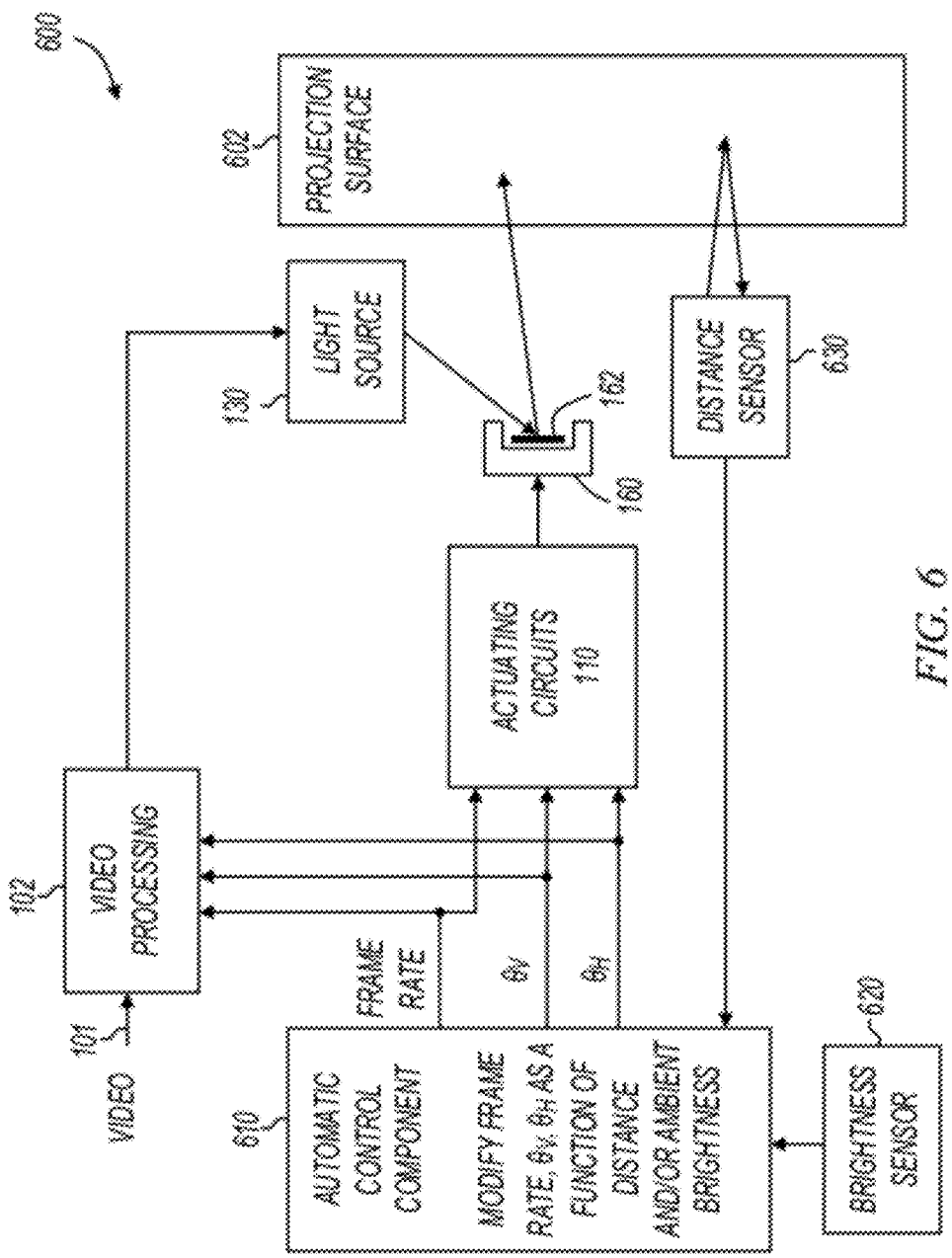
FIGS. 6-8 show dynamic scan angle projectors in accordance with various embodiments of the present invention.

FIG. 6 shows a dynamic scan angle projection apparatus in accordance with various embodiments of the present invention. Apparatus 600 includes video processing component 102, light source 130, actuating circuits 110, and MEMS device 160 with scanning mirror 162, all of which are described above with reference to previous figures. Dynamic scan angle projection apparatus 600 also includes automatic control component 610, brightness sensor 620, and distance sensor 630.

In operation, automatic control component 610 provides the frame rate, $\theta_H$, and $\theta_V$ to actuating circuits 110 and video processing component 102. As described above, actuating circuits 110 receive the frame rate, $\theta_H$, and $\theta_V$, and provide drive signals to MEMS device 160 to effect angular movement of scanning mirror 162. Automatic control component 610 receives signal stimulus from distance sensor 630 and brightness sensor 620. In some embodiments, automatic control component 610 modifies the frame rate, $\theta_H$, and $\theta_V$ in response to the distance between scanning mirror 162 and projection surface 602 as sensed by distance sensor 630. For example, automatic control component 610 may modify $\theta_H$ and $\theta_V$ to maintain a constant resultant display size as the distance to the projection surface changes. Further, automatic control component 610 may modify the frame rate to modify the number of horizontal sweeps per vertical sweep (HSWEEPS) as the distance to the projection surface changes.

Brightness sensor 620 provides ambient brightness information to automatic control component 610, and automatic control component 610 may modify the frame rate, $\theta_H$, and $\theta_V$ in response thereto. For example, automatic control component 610 may modify the size of the resultant display to maintain a display brightness relative to ambient brightness.

In embodiments represented by FIG. 6, video processing component 102 receives the frame rate, $\theta_H$, and $\theta_V$. Video processing component 102 may modify image processing in any manner in response to the information provided. For example, video processing component 102 may modify the generation of display pixel data based on the size of the display, the aspect ratio of the display, the frame rate, individual scan angles, or any combination.

Automatic control component 610 is shown being responsive to two different types of sensors, although the present invention is not limited in this respect. Automatic control component 610 may be responsive to only one sensor, or to more than two sensors.

Automatic control component 610 may be implemented in any manner without departing from the scope of the present invention. For example, automatic control component 610 may include analog and/or digital circuits, an application specific integrated circuit (ASIC), a processor, or any combination.

Figure 7:
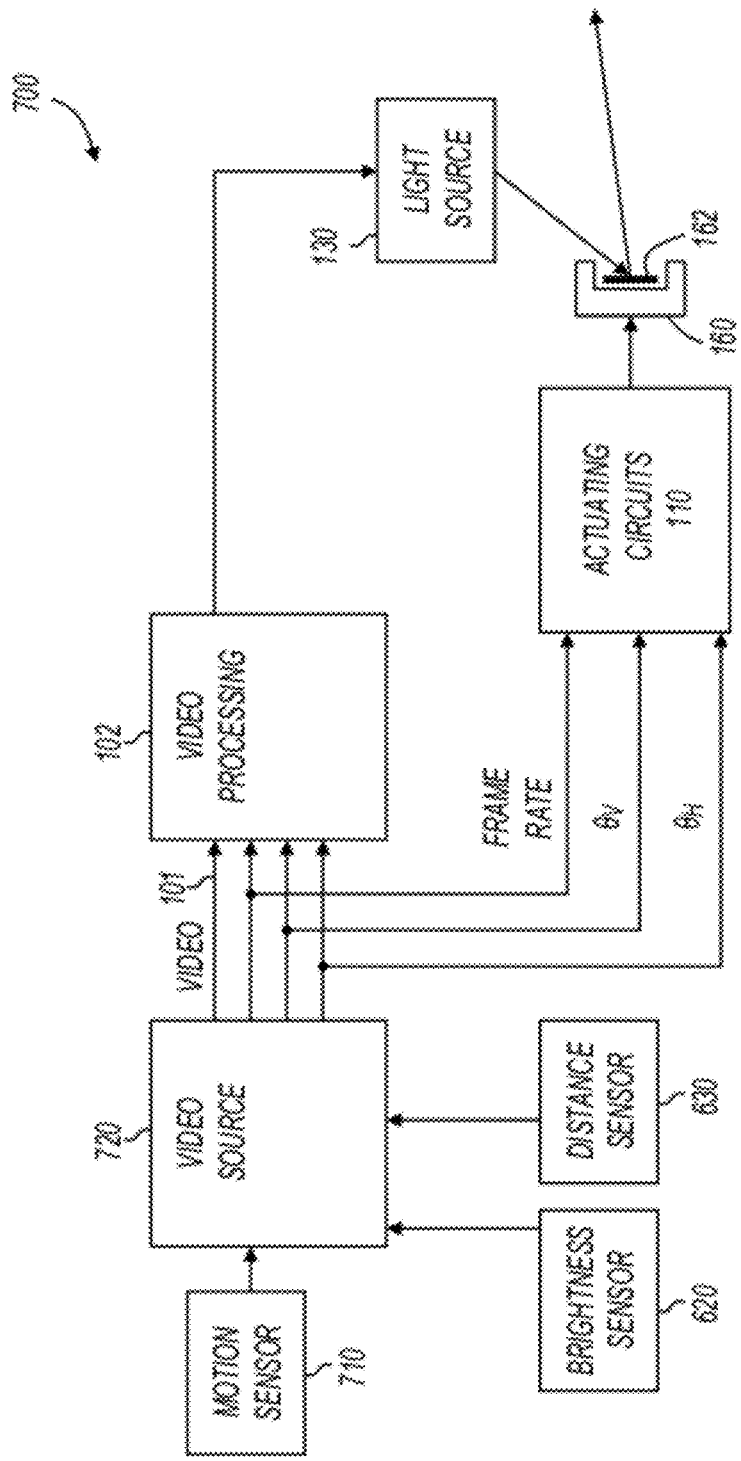

FIG. 7 shows a dynamic scan angle projection apparatus in accordance with various embodiments of the present invention. Apparatus 700 includes video processing component 102, light source 130, actuating circuits 110, MEMS device 160 with scanning mirror 162, brightness sensor 620, and distance sensor 630, all of which are described above with reference to previous figures. Dynamic scan angle projection apparatus 700 also includes motion sensor 710, and video source 720.

Video source 720 may be any device or application that provides video to be displayed by the projection apparatus. For example, in some embodiments, video source 720 may be a video recording and/or playback device. Also for example, in some embodiments, video source 720 may be an application such as a gaming application that provides a video stream that interacts with a user.

Motion sensor 710 may be any type of device that senses motion. Example types of motion sensors include, but are not limited to, accelerometers, gyroscopes, and compasses. Motion sensor 710 may sense motion or rotation on any number of axes. For example, motion sensor 710 may detect motion in an x,y,z coordinate system as well as pitch, yaw, and roll. The motion information is provided to video source 720.

In operation, video source 720 provides the frame rate, $\theta_H$, and $\theta_V$ to actuating circuits 110 and video processing component 102. As described above, actuating circuits 110 receive the frame rate, $\theta_H$, and $\theta_V$, and provide drive signals to MEMS device 160 to effect angular movement of scanning mirror 162. Video source 720 receives signal stimulus from distance sensor 630, brightness sensor 620, and motion sensor 710. In some embodiments, video source 720 modifies the frame rate, $\theta_H$, and $\theta_V$ in response to information provided by the various sensors. For example, video source 720 may modify $\theta_H$ and $\theta_V$ to maintain a constant resultant display size as the distance to the projection surface changes. Further, video source 720 may modify the frame rate to modify the number of horizontal sweeps per vertical sweep (HSWEEPS) as the distance to the projection surface changes. Still further, video source 720 may modify the frame rate, $\theta_H$, and $\theta_V$ in response to motion of the projection apparatus. For example, when the projection apparatus is panned either up/down or left/right, the aspect ratio of the resultant display may be changed to be taller or wider.

Still further, video source 720 may modify the frame rate, $\theta_H$, and $\theta_V$ in response to the video content to be displayed. For example, video source 720 may modify the aspect ratio of the resultant display to be tall and thin when a tall object (e.g., a person, a tree) is to be displayed. Also for example, video source 720 may modify the aspect ratio of the resultant display to be short and wide when a short object (e.g., a skyline, a battlefield) is to be displayed.

Video source 720 is shown being responsive to three different types of sensors, although the present invention is not limited in this respect. Video source 720 may be responsive to only one sensor, or to more than three sensors.

In embodiments represented by FIG. 7, video processing component 102 receives the frame rate, $\theta_H$, and $\theta_V$. Video processing component 102 may modify image processing in any manner in response to the information provided. For example, video processing component 102 may modify the generation of display pixel data based on the size of the display, the aspect ratio of the display, the frame rate, individual scan angles, or any combination. Also for example, as the aspect ratio of a display is changed, the video processing component 102, or video source 720 may rearrange the video content in order to better fit the display parameters, using text wrapping to rearrange the flow of text and moving the position of images or cropping images within the video frame.

Figure 8:
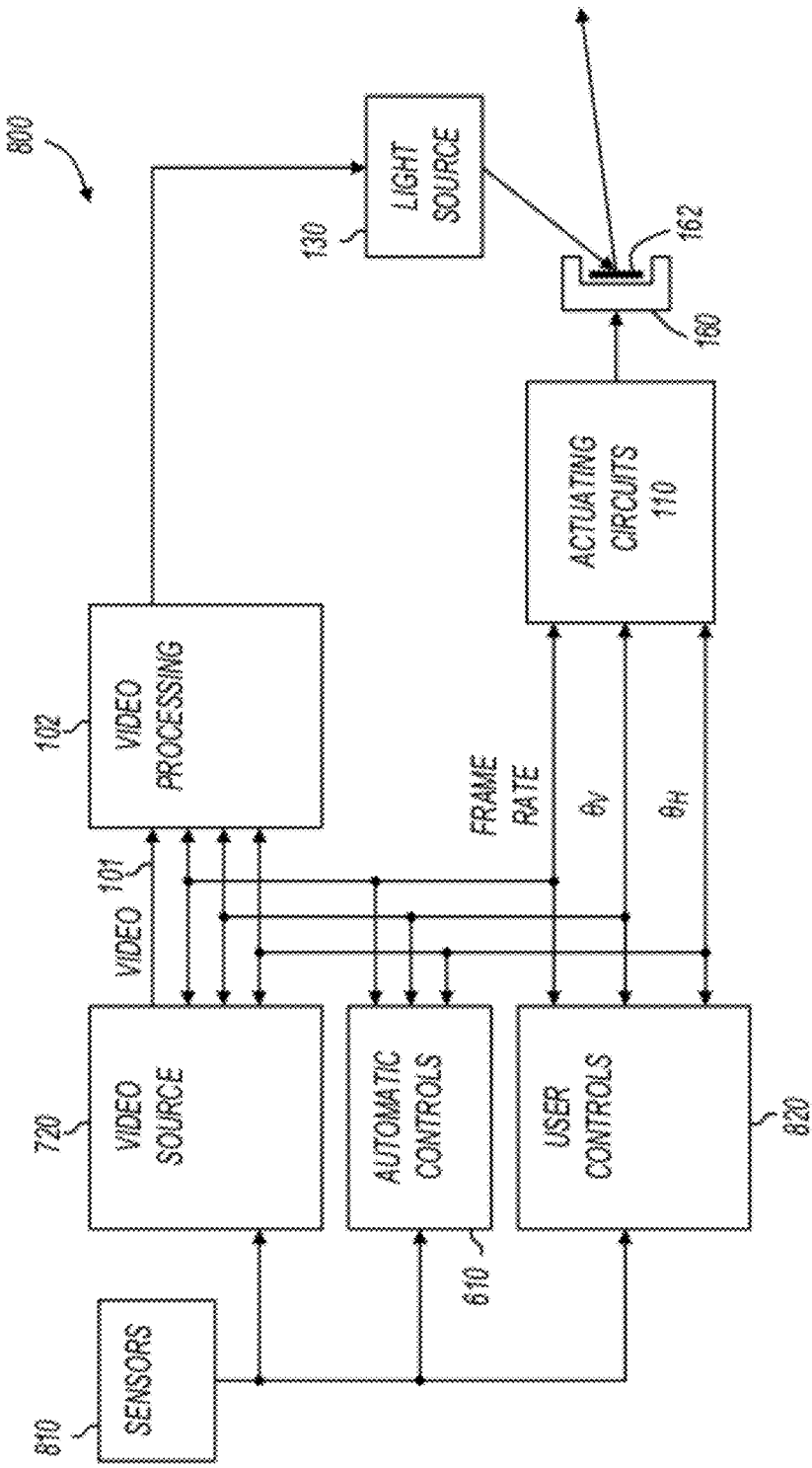

FIG. 8 shows a dynamic scan angle projection apparatus in accordance with various embodiments of the present invention. Apparatus 800 includes video processing component 102, light source 130, actuating circuits 110, MEMS device 160 with scanning mirror 162, video source 720, and automatic control component 610, all of which are described above with reference to previous figures. Dynamic scan angle projection apparatus 800 also includes sensors 810 and user controls 820.

Sensors 810 may include any number and type of sensor that can provide information to the various components shown in FIG. 8. Examples include distance sensors, motion sensors, brightness sensors, sound sensors, pressure sensors, and the like. Sensors 810 provide information to the various components shown in FIG. 8, which then may provide frame rate and scan angle information to each other and to actuating circuits 110. User controls 820 may include any type of control interface that may interact with a user. Examples include buttons, knobs, a touchscreen, or the like.

In operation, any one or combination of video source 720, automatic control component 610, and user controls 820 provides the frame rate, $\theta_H$, and $\theta_V$ to actuating circuits 110 and video processing component 102. As described above, actuating circuits 110 receive the frame rate, $\theta_H$, and $\theta_V$, and provide drive signals to MEMS device 160 to effect angular movement of scanning mirror 162. Video source 720, automatic controls 610, and user controls 820 may receive signal stimulus from sensors 810. In some embodiments, the frame rate, $\theta_H$, and $\theta_V$ are modified in response to information provided by the various sensors. In other embodiments, the frame rate, $\theta_H$, and $\theta_V$ are modified in response to video content or the combination of movement and video content.

In embodiments represented by FIG. 8, video processing component 102 receives the frame rate, $\theta_H$, and $\theta_V$. Video processing component 102 may modify image processing in any manner in response to the information provided. For example, video processing component 102 may modify the generation of display pixel data based on the size of the display, the aspect ratio of the display, the frame rate, individual scan angles, or any combination.

The frame rate, $\theta_H$, and $\theta_V$ may be modified in a manner that preserves one or more qualities of the resultant display. For example, the aspect ratio, the brightness, the size, or the spatial density of horizontal sweeps may be preserved depending on a "mode" that is selected by one of the user, the automatic controls, or the video source. Various modes are shown below in Table 1.

TABLE 1

| Operating Modes | |
|---|---|
| Mode | Operating Characteristics |
| Fixed Brightness Priority Mode | Keep the area of the resultant display the same while allowing aspect ratio adjustments. |
| Fixed Aspect ratio priority Mode | Keep the aspect ratio fixed but grow or shrink the full image at a fixed aperture ratio (allows brightness increase). |
| Brightness Zoom Mode | Choose a portion of the image to increase brightness by reducing the scan field of view. Allow panning through the image by motion detection. |
| Frame Rate Priority Mode | Keep the number of lines and the frame rate fixed as the aspect ratio and scan angles are adjusted. |
| Line Density Priority Mode | Keep the line density constant and let the frame rate change as the vertical scan angle changes. |

Many example applications exist for the various dynamic scan angle projectors described herein. Example applications include, but are not limited to:

1. Change the scan aspect ratio to match display contents. Widescreen for standard content. Wide and short for Direct Projection HUD. Landscape and portrait for photos and documents.

2. Change the aspect ratio and scan angles to fit the available projection space. Pair with text wrapping.

3. Reduce the scan angle to increase brightness in response to an ambient brightness sensor.

4. Keep the brightness and image size constant as distance is changed.

5. Smart applications can rearrange complicated video content, moving text and images and video around to fit new aspect ratios.

6. Simple illumination application—illuminate rectangular areas of different sizes and shapes; also choose the illumination color using red, green, and blue laser light sources.

7. Gaming application where as you pan around to reveal parts of the 3D environment, the projector aspect ratio also changes to show big tall features, short wide features, etc.

Figure 9:
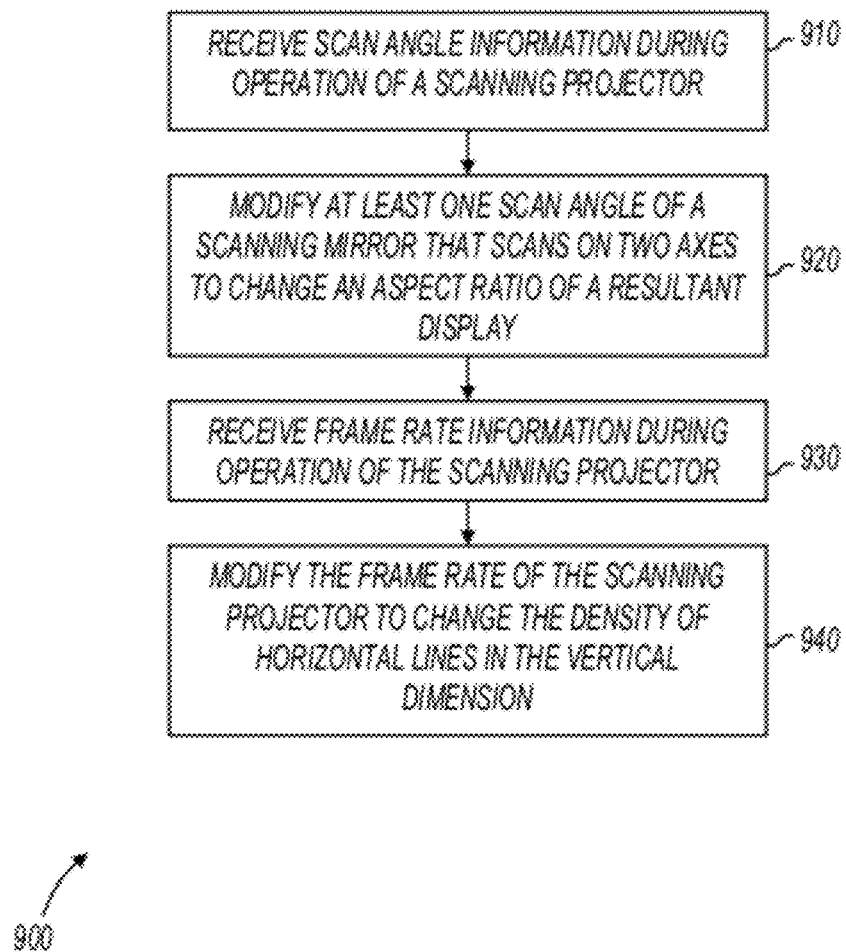
FIG. 9 shows a flow diagram of a method in accordance with various embodiments of the present invention.

FIG. 9 shows a flow diagram of methods in accordance with various embodiments of the present invention. In some embodiments, method 900, or portions thereof, is performed by a dynamic scan angle projection apparatus, embodiments of which are shown in previous figures. In other embodiments, method 900 is performed by a series of circuits or an electronic system. Method 900 is not limited by the particular type of apparatus performing the method. The various actions in method 900 may be performed in the order presented, or may be performed in a different order. Further, in some embodiments, some actions listed in FIG. 9 are omitted from method 900.

Method 900 is shown beginning with block 910. As shown at 910, scan angle information is received during operation of a scanning projector. The scan angle information may be provided from a video source, from a user, from an automatic controller, or from any other source. The scan angle information may be in the form of signals that represent the total angle through which a scanning mirror should deflect. The deflection is in one or more dimensions (e.g., vertical and horizontal).

At 920, at least one scan angle of a scanning mirror that scans on two axes is modified in response to the scan angle information received at 910. In some embodiments, the scan angle modification results in a change in an aspect ratio of the resultant display, and in other embodiments, the aspect ratio of the resultant display remains unchanged.

In some embodiments, the scan angle information is received by actuating circuits coupled to a MEMS device having a scanning mirror (e.g., scanning mirror 162, FIG. 1). The actuating circuits produce stimulus signals to effect angular deflection of the scanning mirror in response to the scan angle information. When the scan angle information changes, the actuating circuits change properties of the signal stimulus which results in an actual scan angle change of the scanning mirror.

The two axes of the scanning mirror may be referred to as a vertical axis and a horizontal axis. The vertical axis may be swept nonsinusoidally, and the horizontal axis may be swept sinusoidally.

At 930, frame rate information is received during operation of the scanning projector, and at 940, the frame rate of the scanning projector is modified to change the density of horizontal lines in the vertical dimension. In some embodiments, the period of the vertical sweep is changed, while the period of the horizontal sweep remains unchanged.

Figure 10:
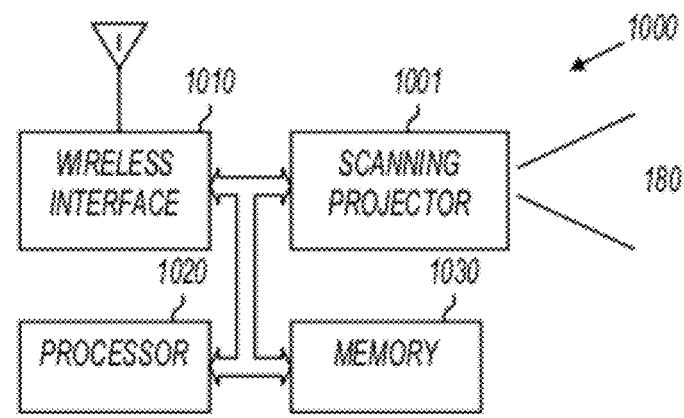
FIG. 10 shows a block diagram of a mobile device in accordance with various embodiments of the present invention.

FIG. 10 shows a block diagram of a mobile device in accordance with various embodiments of the present invention. As shown in FIG. 10, mobile device 1000 includes wireless interface 1010, processor 1020, memory 1030, and scanning projector 1001. Scanning projector 1001 paints a raster image at 180. Scanning projector 1001 is a dynamic scan angle projection apparatus as described above with reference to previous figures. Scanning projector 1001 may be any dynamic scan angle projection apparatus described herein.

Scanning projector 1001 may receive image data from any image source. For example, in some embodiments, scanning projector 1001 includes memory that holds still images. In other embodiments, scanning projector 1001 includes memory that includes video images. In still further embodiments, scanning projector 1001 displays imagery received from external sources such as connectors, wireless interface 1010, a wired interface, or the like.

Wireless interface 1010 may include any wireless transmission and/or reception capabilities. For example, in some embodiments, wireless interface 1010 includes a network interface card (NIC) capable of communicating over a wireless network. Also for example, in some embodiments, wireless interface 1010 may include cellular telephone capabilities. In still further embodiments, wireless interface 1010 may include a global positioning system (GPS) receiver. One skilled in the art will understand that wireless interface 1010 may include any type of wireless communications capability without departing from the scope of the present invention.

Processor 1020 may be any type of processor capable of communicating with the various components in mobile device 1000. For example, processor 1020 may be an embedded processor available from application specific integrated circuit (ASIC) vendors, or may be a commercially available microprocessor. In some embodiments, processor 1020 provides image or video data to scanning projector 1001. The image or video data may be retrieved from wireless interface 1010 or may be derived from data retrieved from wireless interface 1010. For example, through processor 1020, scanning projector 1001 may display images or video received directly from wireless interface 1010. Also for example, processor 1020 may provide overlays to add to images and/or video received from wireless interface 1010, or may alter stored imagery based on data received from wireless interface 1010 (e.g., modifying a map display in GPS embodiments in which wireless interface 1010 provides location coordinates).

Figure 11:
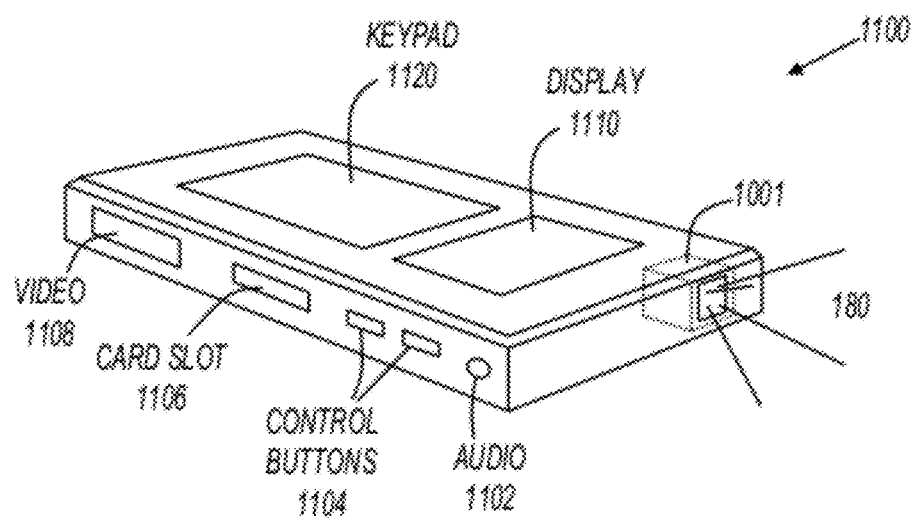
FIG. 11 shows a mobile device in accordance with various embodiments of the present invention.

FIG. 11 shows a mobile device in accordance with various embodiments of the present invention. Mobile device 1100 may be a hand held projection device with or without communications ability. For example, in some embodiments, mobile device 1100 may be a handheld projector with little or no other capabilities. Also for example, in some embodiments, mobile device 1100 may be a device usable for communications, including for example, a cellular phone, a smart phone, a personal digital assistant (PDA), a global positioning system (GPS) receiver, or the like. Further, mobile device 1100 may be connected to a larger network via a wireless (e.g., WiMax) or cellular connection, or this device can accept data messages or video content via an unregulated spectrum (e.g., WiFi) connection.

Mobile device 1100 includes scanning projector 1001 to create an image with light at 180. Mobile device 1100 also includes many other types of circuitry; however, they are intentionally omitted from FIG. 11 for clarity.

Mobile device 1100 includes display 1110, keypad 1120, audio port 1102, control buttons 1104, card slot 1106, and audio/video (A/V) port 1108. None of these elements are essential. For example, mobile device 1100 may only include scanning projector 1001 without any of display 1110, keypad 1120, audio port 1102, control buttons 1104, card slot 1106, or A/V port 1108. Some embodiments include a subset of these elements. For example, an accessory projector product may include scanning projector 1001, control buttons 1104 and A/V port 1108.

Display 1110 may be any type of display. For example, in some embodiments, display 1110 includes a liquid crystal display (LCD) screen. Display 1110 may always display the same content projected at 180 or different content. For example, an accessory projector product may always display the same content, whereas a mobile phone embodiment may project one type of content at 180 while displaying different content on display 1110. Keypad 1120 may be a phone keypad or any other type of keypad.

A/V port 1108 accepts and/or transmits video and/or audio signals. For example, A/V port 1108 may be a digital port that accepts a cable suitable to carry digital audio and video data. Further, A/V port 1108 may include RCA jacks to accept composite inputs. Still further, A/V port 1108 may include a VGA connector to accept analog video signals. In some embodiments, mobile device 1100 may be tethered to an external signal source through A/V port 1108, and mobile device 1100 may project content accepted through A/V port 1108. In other embodiments, mobile device 1100 may be an originator of content, and A/V port 1108 is used to transmit content to a different device.

Audio port 1102 provides audio signals. For example, in some embodiments, mobile device 1100 is a media player that can store and play audio and video. In these embodiments, the video may be projected at 180 and the audio may be output at audio port 1102. In other embodiments, mobile device 1100 may be an accessory projector that receives audio and video at A/V port 1108. In these embodiments, mobile device 1100 may project the video content at 180, and output the audio content at audio port 1102.

Mobile device 1100 also includes card slot 1106. In some embodiments, a memory card inserted in card slot 1106 may provide a source for audio to be output at audio port 1102 and/or video data to be projected at 180. Card slot 1106 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 12:
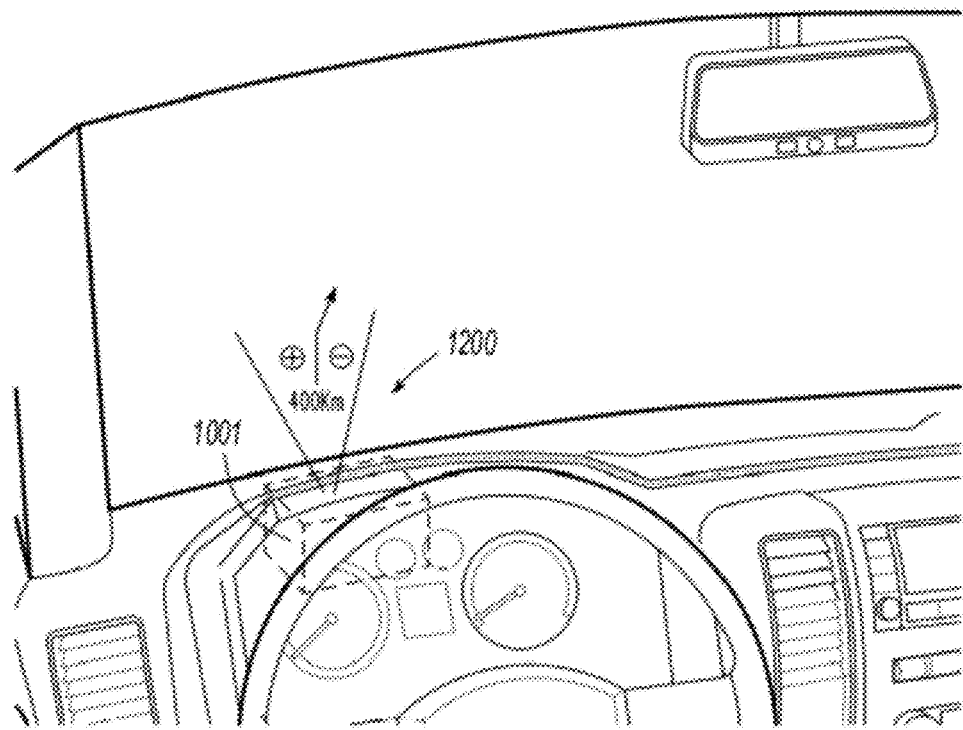
FIG. 12 shows a head-up display system in accordance with various embodiments of the invention.

FIG. 12 shows a head-up display system in accordance with various embodiments of the invention. Projector 1001 is shown mounted in a vehicle dash to project the head-up display at 1200. Although an automotive head-up display is shown in FIG. 12, this is not a limitation of the present invention. For example, various embodiments of the invention include head-up displays in avionics application, air traffic control applications, and other applications. In some embodiments, user controls on projector 1001 are exposed to a driver so that the scan angles may be changed manually. Further, in some embodiments, automatic controls perform scan angle adjustments to compensate for the distance to the windshield and/or ambient brightness. In still further embodiments, scan angles may be specified by a video source (the automotive panel) based on display contents.

Figure 13:
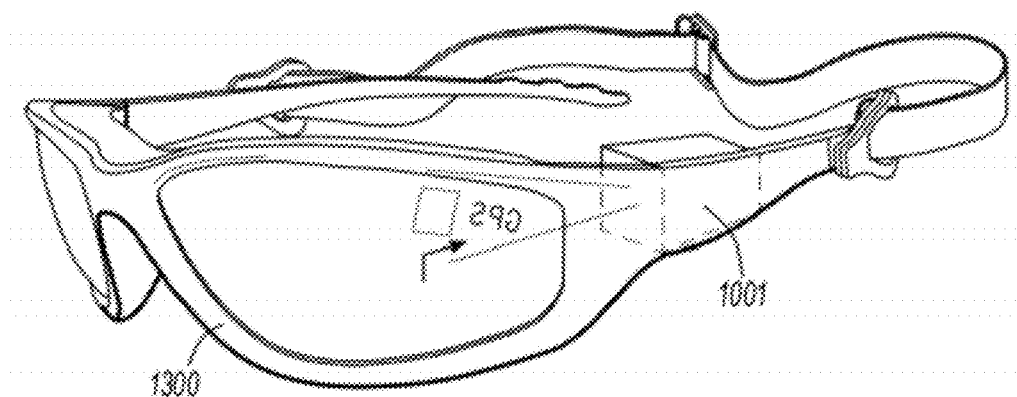
FIG. 13 shows eyewear in accordance with various embodiments of the invention.

FIG. 13 shows eyewear in accordance with various embodiments of the invention. Eyewear 1300 includes projector 1001 to project a display in the eyewear's field of view. In some embodiments, eyewear 1300 is see-through and in other embodiments, eyewear 1300 is opaque. For example, eyewear may be used in an augmented reality application in which a wearer can see the display from projector 1001 overlaid on the physical world. Also for example, eyewear may be used in a virtual reality application, in which a wearer's entire view is generated by projector 1001. Although only one projector 1001 is shown in FIG. 13, this is not a limitation of the present invention. For example, in some embodiments, eyewear 1300 includes two projectors; one for each eye.

Figure 14:
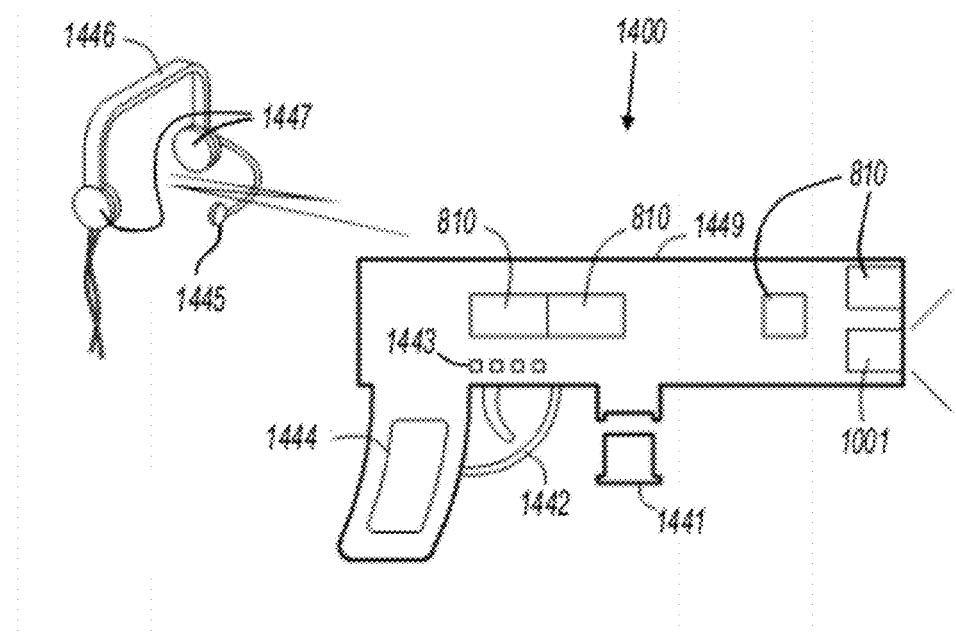
FIG. 14 shows a gaming apparatus in accordance with various embodiments of the present invention.

FIG. 14 shows a gaming apparatus in accordance with various embodiments of the present invention. Gaming apparatus 1400 allows a user or users to observe and interact with a gaming environment. The game is navigated based on the motion, position or orientation of gaming apparatus 1400, an apparatus that includes dynamic scan angle projection apparatus 1001. Other control interfaces, such as manually-operated buttons, foot pedals, or verbal commands, may also contribute to navigation around, or interaction with the gaming environment, including scan angle changes. For example, in some embodiments, trigger 1442 contributes to the illusion that the user or users are in a first person perspective video game environment, commonly known as a "first person shooter game." Because the size, aspect ratio, frame rate, and brightness of the projected display can be controlled by the gaming application in combination with the user's movement, gaming apparatus 1400 creates a highly believable or "immersive" environment for these users.

Many other first person perspective simulations can also be created by gaming apparatus 1400, for such activities as 3D seismic geo-prospecting, spacewalk planning, jungle canopy exploration, automobile safety instruction, medical education, etc. Tactile interface 1444 may provide a variety of output signals, such as recoil, vibration, shake, rumble, etc. Tactile interface 1444 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1400 may also include audio output devices, such as integrated audio speakers, remote speakers, or headphones. These sorts of audio output devices may be connected to gaming apparatus 1400 with wires or through a wireless technology. For example, wireless headphones 1446 provide the user with sound effects via a Bluetooth connection, although any sort of similar wireless technology could be substituted freely. In some embodiments, wireless headphones 1446 may include microphone 1445 or binaural microphone 1447, to allow multiple users, instructors, or observers to communicate. Binaural microphone 1447 typically includes microphones on each ear piece, to capture sounds modified by the user's head shadow. This feature may be used for binaural hearing and sound localization by other simulation participants.

Gaming apparatus 1400 may include any number of sensors 810 that measure distance, ambient brightness, motion, position, orientation, and the like. For example, gaming apparatus 1400 may detect absolute heading with a digital compass, and detect relative motion with an x-y-z gyroscope or accelerometer. In some embodiments, gaming apparatus 1400 also includes a second accelerometer or gyroscope to detect the relative orientation of the device, or its rapid acceleration or deceleration. In other embodiments, gaming apparatus 1400 may include a Global Positioning Satellite (GPS) sensor, to detect absolute position as the user travels in terrestrial space.

Gaming apparatus 1400 may include battery 1441 and/or diagnostic lights 1443. For example, battery 1441 may be a rechargeable battery, and diagnostic lights 1443 could indicate the current charge of the battery. In another example, battery 1441 may be a removable battery clip, and gaming apparatus 1400 may have an additional battery, electrical capacitor or super-capacitor to allow for continued operation of the apparatus while the discharged battery is replaced with a charged battery. In other embodiments, diagnostic lights 1443 can inform the user or a service technician about the status of the electronic components included within or connected to this device. For example, diagnostic lights 1443 may indicate the strength of a received wireless signal, or the presence or absence of a memory card. Diagnostic lights 1443 could also be replaced by any small screen, such as an organic light emitting diode or liquid crystal display screen. Such lights or screens could be on the exterior surface of gaming apparatus 1400, or below the surface, if the shell for this apparatus is translucent or transparent.

Other components of gaming apparatus 1400 may be removable, detachable or separable from this device. For example, the dynamic scan angle projection apparatus may be detachable or separable from gaming housing 1449. In some embodiments, the subcomponents of the dynamic scan angle projection apparatus may be detachable or separable from gaming housing 1449, and still function.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising: a scanning mirror assembly to scan light on a first axis and a second axis during operation, the scanning mirror assembly including at least one scanning mirror; a light source to provide the light to the scanning mirror assembly; and an actuating circuit to effect scanning of the scanning mirror assembly on at least one of the first axis and second axis, wherein the actuating circuit modifies a scan angle of the scanning mirror assembly during operation, wherein the scan angle is a total angle through which the at least one scanning mirror deflects; wherein the scan angle of the first and second axes are modified to change an aspect ratio of a resultant display; and wherein a density of horizontal lines in a vertical dimension is kept constant as the aspect ratio is modified.

2. The apparatus of claim 1 wherein the actuating circuit modifies the scan angle on the first axis.

3. The apparatus of claim 1 wherein the actuating circuit modifies the scan angle on the first axis and the second axis.

4. The apparatus of claim 1 wherein the first axis is a horizontal axis and the second axis is a vertical axis.

5. The apparatus of claim 4 wherein the scanning mirror assembly scans sinusoidally on the horizontal axis and non-sinusoidally on the vertical axis.

6. The apparatus of claim 4 wherein a vertical period is changed when the scan angle on the vertical axis is changed.

7. The apparatus of claim 4 wherein a vertical period is not changed when the scan angle on the vertical axis is changed.

8. A method comprising: receiving scan angle information during operation of a scanning laser projector; and modifying at least one scan angle of a scanning mirror that scans on two axes to change an aspect ratio of a resultant display, wherein the scan angle is a total angle through which the scanning mirror deflects; wherein the scan angle of the first and second axes are modified to change an aspect ratio of a resultant display; and wherein a density of horizontal lines in a vertical dimension is kept constant as the aspect ratio is modified.

9. The method of claim 8 wherein modifying at least one scan angle comprises modifying a scan angle in a vertical dimension.

10. A mobile device comprising: a communications transceiver; and a scanning laser projector coupled to the communications transceiver, the scanning laser projector including a scanning mirror and actuating circuitry to change at least one scan angle of the scanning mirror during operation to modify an aspect ratio of a resultant display, wherein the at least one scan angle is a total angle through which the scanning mirror deflects; wherein the scan angle of the first and second axes are modified to change an aspect ratio of a resultant display; and wherein a density of horizontal lines in a vertical dimension is kept constant as the aspect ratio is modified.

11. The apparatus of claim 10 wherein the first axis is a horizontal axis and the second axis is a vertical axis.

12. The apparatus of claim 11 wherein the scanning mirror scans sinusoidally on the horizontal axis and nonsinusoidally on the vertical axis.

13. The apparatus of claim 11 wherein a vertical period is changed when the scan angle on the vertical axis is changed.

14. The apparatus of claim 11 wherein a vertical period is not changed when the scan angle on the vertical axis is changed.

* * * * *